United States Patent
Tascan et al.

(10) Patent No.: US 12,334,614 B2
(45) Date of Patent: Jun. 17, 2025

(54) POLYVINYLIDENE FLUORIDE MEMBRANE SUPPORT

(71) Applicant: COMPAGNIE GENERALE DES ETABLISSEMENTS MICHELIN, Clermont-Ferrand (FR)

(72) Inventors: Mevlut Tascan, Breinigsville, PA (US); Todd Crumbling, Perkasie, PA (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 750 days.

(21) Appl. No.: 17/624,614

(22) PCT Filed: Jul. 15, 2020

(86) PCT No.: PCT/US2020/042034
§ 371 (c)(1),
(2) Date: Jan. 4, 2022

(87) PCT Pub. No.: WO2021/011590
PCT Pub. Date: Jan. 21, 2021

(65) Prior Publication Data
US 2022/0271315 A1    Aug. 25, 2022

Related U.S. Application Data

(60) Provisional application No. 62/875,096, filed on Jul. 17, 2019, provisional application No. 62/874,095, filed on Jul. 15, 2019.

(51) Int. Cl.
*H01M 8/106* (2016.01)
*H01M 8/10* (2016.01)
(Continued)

(52) U.S. Cl.
CPC ......... *H01M 8/106* (2013.01); *H01M 8/1004* (2013.01); *H01M 8/1023* (2013.01);
(Continued)

(58) Field of Classification Search
CPC .. H01M 8/106; H01M 8/1004; H01M 8/1023; H01M 8/1027; H01M 8/1032;
(Continued)

(56) References Cited

U.S. PATENT DOCUMENTS 5,087,345 A    2/1992   Kashiwada et al.

FOREIGN PATENT DOCUMENTS

KR   20160059285 A      5/2016
WO   WO2011/052538   *  5/2011   ............. B01J 47/12

OTHER PUBLICATIONS

International Search Report and Written Opinion mailed Oct. 26, 2020 for International Application No. PCT/US2020/042034, 9 pages.

* cited by examiner

*Primary Examiner* — Helen Oi K Conley
(74) *Attorney, Agent, or Firm* — Dickinson Wright PLLC

(57) ABSTRACT

A fuel cell membrane electrode assembly includes a substrate and a porous polymer membrane. The substrate includes a woven layer including a yarn of polyvinylidene fluoride (PVDF) fiber. The yarn is 7 to 25 denier. The substrate also includes a nanofiber layer including PVDF nanofibers deposited on the woven layer. The nanofiber layer is 1 to 10 micrometers (μm) thick. The substrate exhibits a porosity of at least 70 percent and is less than 30 μm thick. The porous polymer membrane is deposited on the nanofiber layer. The substrate is a porous support for a fuel cell membrane. A method of forming a fuel cell membrane electrode assembly includes weaving a woven layer of a
(Continued)

yarn including fiber of PVDF. The method also includes depositing a nanofiber layer on the woven layer to form a substrate. The method further includes depositing a porous polymer membrane on the nanofiber layer.

19 Claims, 2 Drawing Sheets

(51) Int. Cl.
    *H01M 8/1004*     (2016.01)
    *H01M 8/1023*     (2016.01)
    *H01M 8/1027*     (2016.01)
    *H01M 8/1032*     (2016.01)
    *H01M 8/1039*     (2016.01)
    *H01M 8/1062*     (2016.01)

(52) U.S. Cl.
    CPC ....... *H01M 8/1027* (2013.01); *H01M 8/1032* (2013.01); *H01M 8/1039* (2013.01); *H01M 8/1062* (2013.01); *H01M 2008/1095* (2013.01); *H01M 2300/0082* (2013.01)

(58) Field of Classification Search
    CPC ............. H01M 8/1039; H01M 8/1062; H01M 2008/1095; H01M 2300/0082; H01M 8/0289; H01M 8/0245; Y02E 60/50
    See application file for complete search history.

200 m 5 m

POLYVINYLIDENE FLUORIDE MEMBRANE SUPPORT

CROSS-REFERENCE TO RELATED APPLICATIONS

This U.S. national phase patent application claims priority to a d the benefit of international patent application no. PCT/US2020/042034, filed Jul. 15, 2020, which claims priority to and the benefit of U.S. Provisional Application No. 62/874,095 filed Jul. 15, 2019, and U.S. Provisional Application No. 62/875,096 filed Jul. 17, 2019, both of which are hereby incorporated by reference in their entirety herein.

FIELD OF THE INVENTION

The present disclosure is directed to textile reinforcement of battery and fuel cell membranes.

BACKGROUND

In fuel cell and battery applications, a very thin conductive membrane structure is necessary for optimal electron exchange. Conventional fuel cell membranes have very low strength. The porous films separating the cathode and anode exhibit plastic elongation resulting in structural deformation and loss of structural integrity during the production processes and/or during use of the fuel cell.

Structural supports can be added to the conductive membrane structure to improve structural integrity. While conventional textile support structures can provide structural support, they also increase the thickness of the membrane structure and reduce the ionic transport rate of the cell. Conventional materials may also be subject to degradation due to the harsh chemical environment within the cell.

SUMMARY

What is therefore needed is a conductive membrane with a durable support structure exhibiting improved chemical resistance and porosity with a pore size suitable for next generation fuel cells.

In an exemplary embodiment, a fuel cell membrane electrode assembly (MEA) includes a substrate and a porous polymer membrane. The substrate includes a woven layer including a yarn of polyvinylidene fluoride fiber. The yarn is 7 denier to 25 denier. The substrate also includes a nanofiber layer including polyvinylidene fluoride nanofibers deposited on the woven layer. The nanofiber layer is 1 to 10 micrometers (μm) thick. The substrate exhibits a porosity of at least 70 percent and is less than 30 μm thick. The porous polymer membrane is deposited on the nanofiber layer.

In another exemplary embodiment, a method of forming a fuel cell membrane electrode assembly includes weaving a woven layer of a yarn including fiber of polyvinylidene fluoride. The method also includes depositing a nanofiber layer on the woven layer to form a substrate including the nanofiber layer on the woven layer. The substrate has a porosity of at least 70 percent. The method further includes depositing a porous polymer membrane on the nanofiber layer.

In another exemplary embodiment, a porous support for a fuel cell membrane includes a woven layer including a yarn of polyvinylidene fluoride fiber. The yarn is 7 denier to 25 denier. The porous support also includes a nanofiber layer including polyvinylidene fluoride nanofibers deposited on the woven layer. The nanofiber layer is 1 to 10 micrometers thick. The porous support exhibits a porosity of at least 70 percent and is less than 30 micrometers thick.

Other features and advantages of the present invention will be apparent from the following more detailed description of the preferred embodiment which illustrates, by way of example, the principles of the invention.

BRIEF DESCRIPTION OF THE DRAWINGS

Wherever possible, the same reference numbers will be used throughout the drawings to represent the same parts.

DETAILED DESCRIPTION

Provided is a multi-layered textile that provides a porous support to the porous membrane of a fuel cell or battery.

Figure 1:
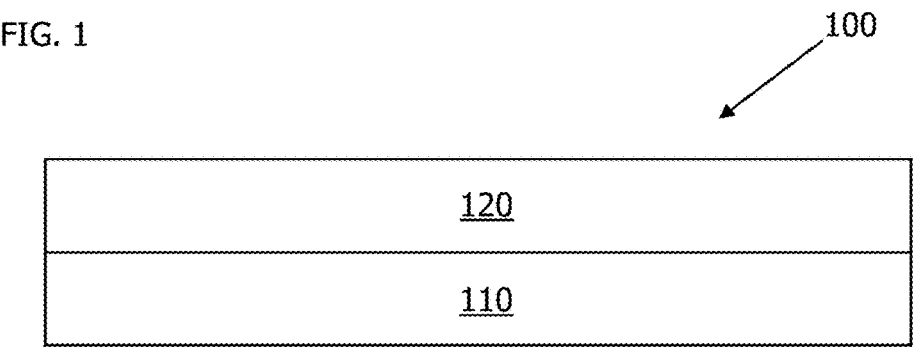
FIG. 1 illustrates a fibrous substrate in an embodiment of the present disclosure.

FIG. 1 shows a fibrous substrate 100 capable of supporting a fuel cell membrane. The fibrous substrate 100 includes a woven layer 110. The woven layer 110 exhibits a porosity of at least 50 percent, alternatively at least 60 percent, alternatively at least 70 percent, alternatively at least 80 percent, or any value, range, or sub-range therebetween. The woven layer 110 may be formed from a variety of weaves including a leno weave or a plain weave. In one embodiment, the woven layer 110 includes a leno weave having a porosity of at least 80 percent.

The woven layer 110 includes one or more fibers resistant to the chemical environment of the fuel cell. Suitable chemically resistant fibers may include, but are not limited to, polyvinylidene fluoride (PVDF) fibers. In exemplary embodiments, the PVDF polymer is an extrusion-grade or fiber-grade polymer having a melt flow index (mfi) in the range of 7 mfi to 30 mfi, as measured by ASTM D1238 or International Organization for Standardization (ISO) 1133 standards, which are incorporated by reference herein, for melt flow index measurement.

The fibers of the woven layer 110 include low denier fibers. In some embodiments, the denier of the woven layer 110 fibers is less than 30 denier, alternatively less than 20 denier, alternatively less than 15 denier, alternatively less than 12 denier, alternatively at least 3 denier, alternatively at least 5 denier, alternatively at least 7 denier, alternatively at least 10 denier, or any value, range, or sub-range therebetween. The fibers may be monofilaments, but typically are yarns having multiple filaments. In some embodiments, the yarns have a number of filaments in the range of 4 to 10, alternatively 5 to 9, or alternatively 6 to 8, although greater or fewer number of filaments may be employed. The filaments of the yarn may all be of the same material or may be a combination of two or more different materials. In one embodiment, the woven layer 110 includes a 20 denier PVDF yarn having 8 filaments.

In order to increase the porosity of the woven layer 110, the fibers of the yarn may include one or more multi-component fibers having a removable component. The formation of the woven layer 110 from a yarn including a removable component allows a higher density mechanically stable textile to be initially produced with subsequent treatment to provide high porosity. Suitable compositions for the removable component may include, but are not limited to, polyvinyl acetate (PVA), polylactic acid (PLA), poly(glycolic acid) (PGA), poly(lactic-co-glycolic acid) (PLGA), poly(ε-caprolactone) (PCL), and poly-L-lactide (PLLA). In exemplary embodiments, the woven layer 110 includes yarn having a sheath-core fiber with the removable component as the sheath and PVDF as the core. In one embodiment, the multi-component fiber is a three denier PVA sheath-PVDF core fiber. After weaving, the woven layer 110 may be treated to remove the PVA portion of the multi-component fiber, thus reducing the final fiber denier within the woven layer 110. In some embodiments, the removable component is removed by treatment with water. In some embodiments, the resulting final fiber denier is less than 20 denier, alternatively less than 15 denier, alternatively less than 12 denier, alternatively less than 10 denier, alternatively at least 0.2 denier, alternatively at least 0.5 denier, alternatively at least 1 denier, alternatively at least 3 denier, alternatively at least 5 denier, alternatively at least 7 denier, or any value, range, or sub-range therebetween. In some embodiments, the number of filaments in the yarn is less than 30, alternatively less than 24, alternatively less than 18, alternatively less than 12, alternatively less than 8, alternatively at least 1, alternatively at least 2, alternatively at least 4, alternatively at least 6, alternatively at least 8, or any value, range, or sub-range therebetween.

Removing the removable component may further increase the porosity of the woven layer 110. In some embodiments, the porosity of the woven layer 110 after removal of the removable component is at least 70 percent, alternatively at least 75 percent, alternatively at least 80 percent, alternatively at least 85 percent, alternatively at least 90 percent, alternatively at least 95 percent, or any value, range, or sub-range therebetween.

Alternatively, or in addition to using multi-component fibers, the woven layer 110 may be formed using at least two different fibers made from two different polymers. In some embodiments, the woven layer 110 is formed by weaving a first yarn of a non-removable fiber, such as PVDF fiber, and a second yarn formed from a removable (i.e. fugitive) fiber, such as PVA, to form the woven layer 110. The woven layer 110 is subsequently treated to remove the removable fiber, such as by dissolution of the PVA fibers by water. In some embodiments, a plurality of fibers formed from one or more chemically-resistant, non-removable components and a plurality of fibers formed from removable components may be present in one or more of the warp and weft of the woven layer 110. In one embodiment, the woven layer 110 is formed from non-removable fibers in the warp direction and a combination of non-removable and removable fibers in the weft direction. In some embodiments, the number of fibers in the yarn is less than 30, alternatively less than 24, alternatively less than 18, alternatively less than 12, alternatively less than 8, alternatively at least 1, alternatively at least 2, alternatively at least 4, alternatively at least 6, alternatively at least 8, or any value, range, or sub-range therebetween. In some embodiments, the non-removable and removable fibers in the weft direction are present in a weight ratio (non-removable to removable) of 2:1 to 1:5, alternatively in a weight ratio of 2:1 to 1:1, alternatively in a weight ratio of 1:1 to 1:2, alternatively in a weight ratio of 1:2 to 1:3, alternatively in a weight ratio of 1:3 to 1:5, or any value, range, or sub-range therebetween.

Alternatively, the woven layer 110 may be formed from a yarn or co-spun fiber having a non-removable and a removable component. For example, a 20 denier yarn formed from 5 PVDF filaments and 3 PVA filaments may be used in one or more of the warp or weft of the woven layer 110.

The woven layer 110 provides strength and porosity to the substrate 100. However, the highly porous skeleton provides only a small surface area to which a membrane can be attached. Increasing the available surface area may result in a stronger bond between the fuel cell membrane and support substrate 100. A nanofiber layer 120 may be deposited on the woven layer 110 to provide a porous contact layer having a high surface area. The nanofiber layer 120 may be formed from the same or different materials as the woven layer 110. In some embodiments, the nanofiber layer 120 includes PVDF nanofibers. In one embodiment, the nanofiber layer 120 includes PVDF nanofibers deposited by electrospinning. In some embodiments, the nanofiber 120 layer may be formed by electrospinning from a solution of polyvinylidene fluoride at 20 to 34 percent in a solvent, such as dimethylformamide (DMF), at a voltage in the range of 8000 to 25000 volts, with a nozzle distance in the range of 10 to 30 centimeters. The resulting nanofibers may have a diameter in the range of 100 to 700 nanometers, alternatively in the range of 100 to 600 nanometers, or any value, range, or sub-range therebetween.

In exemplary embodiments, the nanofiber layer 120 is formed from PVDF fibers deposited on a PVDF woven layer 110 after removal of the removable component to avoid the possibility of the nanofiber layer 120 being damaged during the removal.

In some embodiments, the average pore size of the resulting nanofiber layer 120 is less than 1.5 μm, alternatively less than 1.3 μm, alternatively less than 1.0 μm, alternatively less than 0.9 μm, alternatively less than 0.8 μm, or any value, range, or sub-range therebetween. In some embodiments, the thickness of the nanofiber layer 120 is at least 1.0 μm, alternatively 1.0 μm to 10 μm, alternatively at least 1.5 μm, alternatively 1.5 μm to 10 μm, alternatively at least 2.0 μm, alternatively less than 10 μm, alternatively less than 8 μm, alternatively less than 6 μm, alternatively less than 4 μm, alternatively less than 3.5 μm, alternatively less than 3.0 μm, or any value, range, or sub-range therebetween.

In an exemplary embodiment, a PVDF composite fabric substrate 100 was formed from a leno weave woven layer 110 of 30-denier, 8-filament PVDF yarn having a circular cross-section. A nanofiber layer 120 of PVDF nanofibers was deposited on the PVDF woven layer 110 by electrospinning. The electrospinning was performed using a 30 percent PVDF solution in DMF using one needle at a distance of 15 centimeters from the woven layer 110 at a voltage of 15000 volts. The resulting composite fabric substrate exhibited a thickness of 45 μm.

Figure 3:
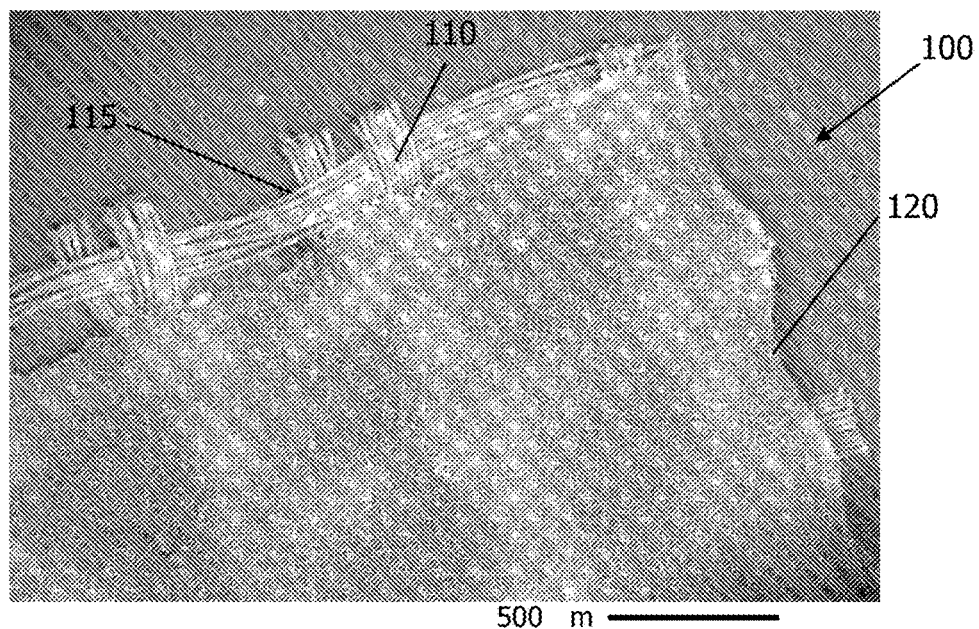
FIG. 3 is a scanning electron microscope (SEM) image of a region of electrospun polyvinylidene fluoride (PVDF) fiber over a leno weave woven layer in an embodiment of the present disclosure.
Figure 4:
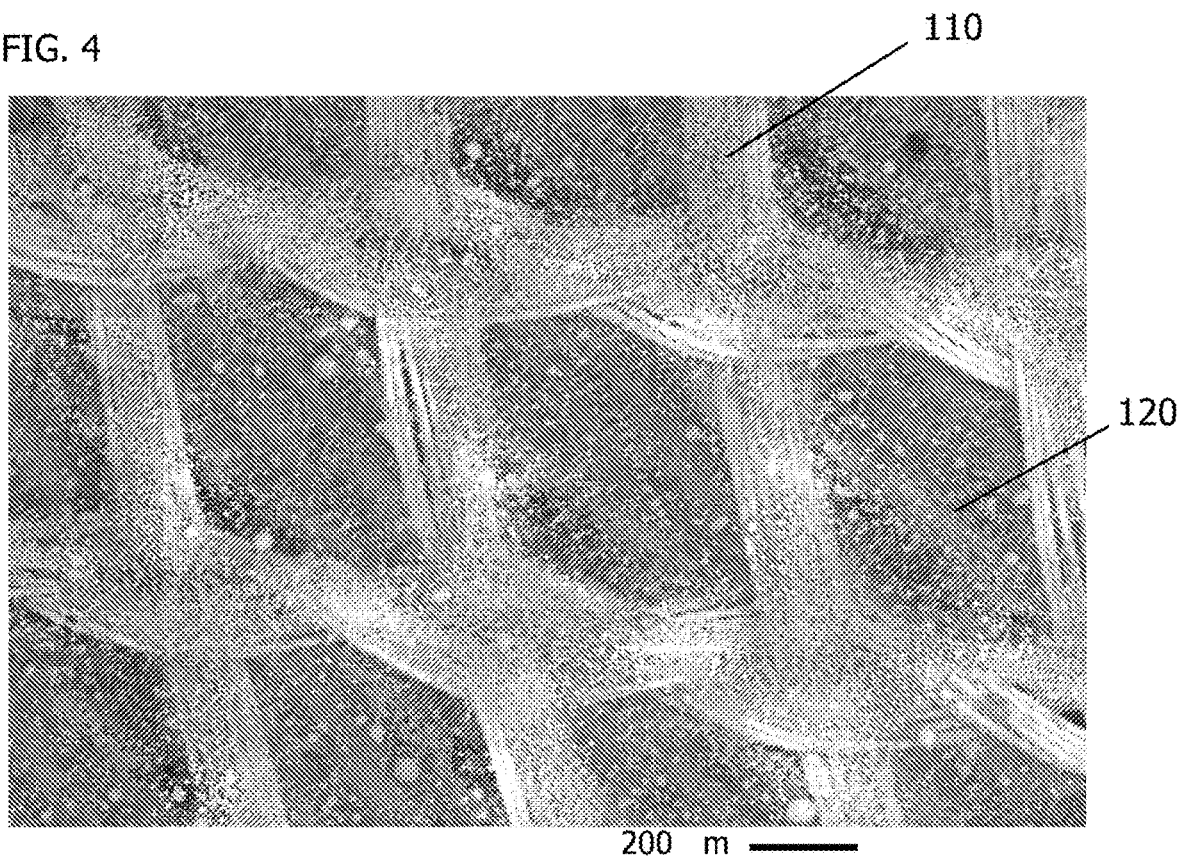
FIG. 4 is an SEM image at a higher magnification of a smaller region of the electrospun PVDF fiber over a leno weave woven layer of FIG. 3.
Figure 5:
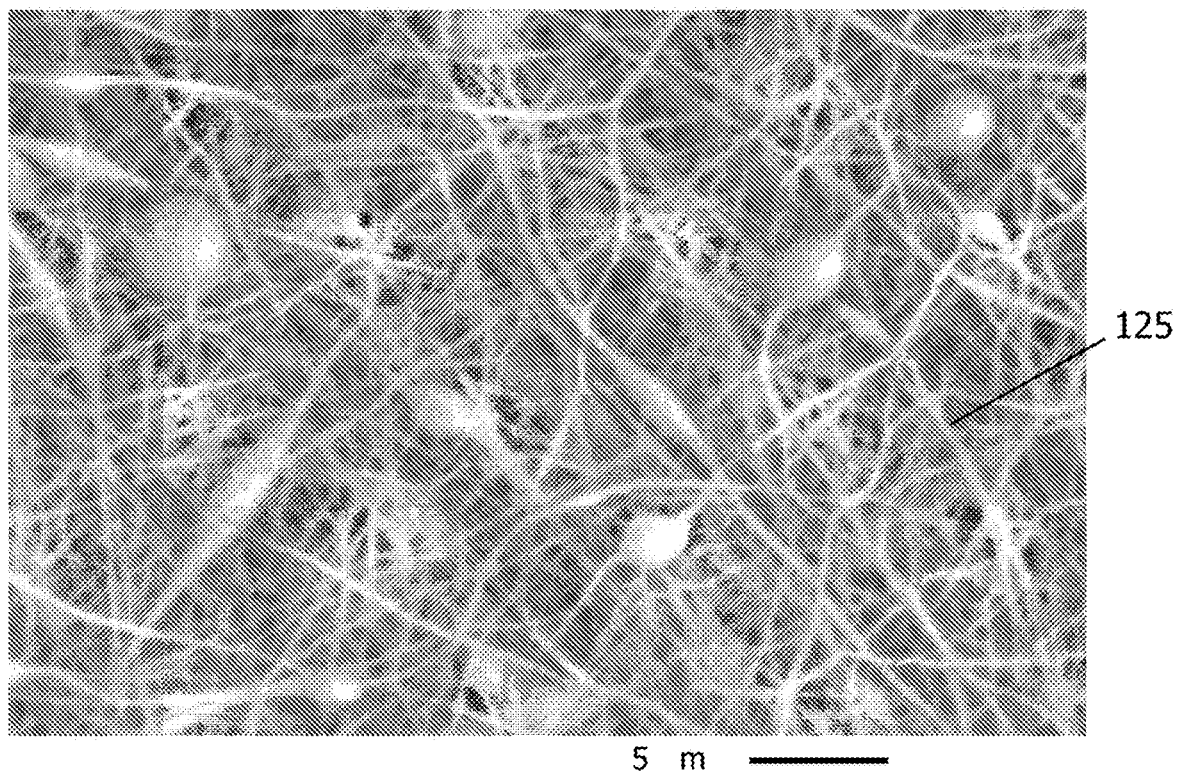
FIG. 5 is an SEM image at a still higher magnification of a smaller region of the electrospun PVDF fiber over a leno weave woven layer of FIG. 4.

SEM images of the formed PVDF composite fabric substrate 100 are shown in FIG. 3, FIG. 4, and FIG. 5. In FIG. 3, the nanofiber layer 120 is on top of the woven layer 110, but the yarn 115 of the woven layer 110 can be clearly seen where parts of the woven layer 110 are not covered by the nanofiber layer 120. In FIG. 4, the woven layer 110 is roughly visible under the nanofiber layer 120 at a higher magnification than in FIG. 3. In FIG. 5, the individual nanofibers 125 of the nanofiber layer 120 are visible at a higher magnification than in FIG. 4.

The efficiency of ionic transport across the fuel cell membrane and support substrate, also known as the membrane electrode assembly (MEA), may be enhanced by reducing the thickness of the membrane electrode assembly. In some embodiments, the substrate 100 may be calendered to reduce the thickness of the substrate prior to the attachment of the fuel cell membrane. In some embodiments, the woven layer 110 may be calendered prior to the deposition of the nanofiber layer 120. In some embodiments, the substrate 100, including both the woven layer 110 and nanofiber layer 120 may be calendered. The calendered substrate 100 may have a thickness less than 30 μm, alternatively less than 25 μm, alternatively less than 20 μm, alternatively less than 15 μm, alternatively greater than 7 μm, alternatively greater than 10 μm, alternatively greater than 12 μm, or any value, range, or sub-range therebetween. In some embodiments, the porosity of the calendered substrate 100 is in the range of 60 percent to 90 percent.

Figure 2:
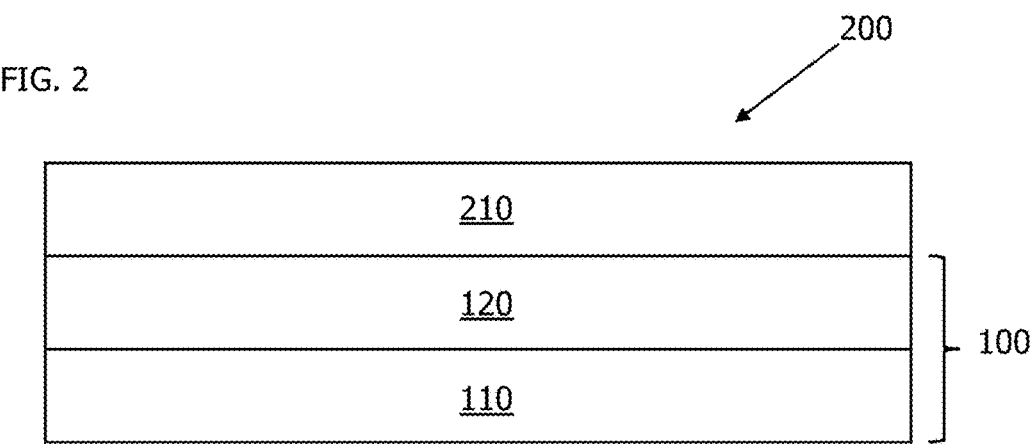
FIG. 2 illustrates a membrane electrode assembly in an embodiment of the present disclosure.

A membrane electrode assembly (MEA) 200 is shown in FIG. 2. The MEA 200 may include the substrate 100 as described above in FIG. 1. A porous fuel cell membrane 210 may be deposited on the nanofiber layer 120. In exemplary embodiments, the porous fuel cell membrane 210 is a porous polymer membrane of a perfluorosulfonic acid (PFSA) polymer or a sulfonated hydrocarbon polymer. The fuel cell membrane 210 may include a film of a PFSA or a proton exchange membrane (PEM) including an ionomer, such as a sulfonated hydrocarbon-based proton exchange membrane. In some embodiments, the hydrocarbon-based proton exchange membrane is a material of formula (1).

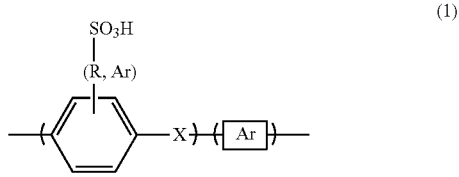

(1)

where x is a sulfonic acid group (SO$_3$H), a single bond, or a C$_1$-C$_5$ substituted or unsubstituted aliphatic carbon group, R is a single bond or a C$_1$-C$_5$ substituted or unsubstituted aliphatic carbon group, and each aromatic ring (Ar) is independently a substituted or unsubstituted aromatic group.

The durability of the MEA 200 may be enhanced by the substrate 100. A typical mode of failure in a fuel cell results from undesired chemical side reactions causing increased brittleness of the polymer membrane 210. As the fuel cell is cycled during operation, the polymer membrane 210 expands and contracts due to changes in the relative humidity (RH) internal to the fuel cell. This expansion and contraction cycling imparts mechanical stress to the brittle membrane, ultimately resulting in structural failure.

The substrate 100 may act as a counter force during the expansion and contraction of the polymer membrane 210. The strong bond formed between the large surface area nanofiber layer 120 of the substrate 100 and the polymer membrane 210 allows the substrate 100 to impart a counter force analogous to a spring during the expansion (i.e. swelling) of the polymer membrane 210 during use. This counter force may reduce the repetitive mechanical stresses imparted during use and extend the service life of the fuel cell membrane 210 and overall MEA 200.

Suitable fuel cell membranes may be formed from materials sold under the tradenames Nafion® [The Chemours Company FC, LLC, Wilmington, DE], Flemion® [AGC Inc., Tokyo, Japan], or Aquivion® [Solvay SA, Brussels, Belgium]. For automotive applications, a fuel cell porous polymer membrane typically has a thickness less than 20 μm to minimize ohmic losses.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel cell membrane electrode assembly (MEA) comprising:
   a) a substrate, the substrate comprising:
      i) a woven layer comprising a yarn of polyvinylidene fluoride fiber, wherein the yarn is 7 denier to 25 denier; and
      ii) a nanofiber layer comprising polyvinylidene fluoride nanofibers deposited on the woven layer, wherein the nanofiber layer is 1 to 10 micrometers thick; wherein the substrate exhibits a porosity of at least 70 percent; and wherein the substrate is less than 30 micrometers thick; and
   b) a porous polymer membrane deposited on the nanofiber layer.

2. The fuel cell MEA of claim 1, wherein the yarn has a number of filaments in the range of 4 to 10.

3. The fuel cell MEA of claim 1, wherein the nanofiber layer is an electrospun layer.

4. The fuel cell MEA of claim 1, wherein the nanofiber layer has an average pore size of less than 1.5 micrometers.

5. The fuel cell MEA of claim 1, wherein the porous polymer membrane comprises a polymer is selected from the group consisting of a perfluorosulfonic acid polymer and a sulfonated hydrocarbon polymer.

6. A method of forming a fuel cell membrane electrode assembly, the method comprising:
   weaving a woven layer comprising a first yarn comprising fiber of polyvinylidene fluoride, wherein the first yarn further comprises a removable component, and the removable component has a composition selected from the group consisting of polyvinyl acetate, polylactic acid, poly(glycolic acid), poly(lactic-co-glycolic acid), poly(ε-caprolactone), and poly-L-lactide;
   depositing a nanofiber layer on the woven layer to form a substrate comprising the nanofiber layer on the woven layer, the substrate having a porosity of at least 70 percent; and
   depositing a porous polymer membrane on the nanofiber layer.

7. The method of claim 6, wherein the weaving comprises leno weaving.

8. The method of claim 6, wherein the weaving comprises plain weaving.

9. The method of claim 6, wherein the first yarn has a denier in the range of 3 to 30.

10. The method of claim 6, wherein the first yarn has a number of filaments in the range of 4 to 10.

11. The method of claim 6 further comprising removing the removable component by treatment with water after the weaving.

12. The method of claim 6, wherein the woven layer further comprises a second yarn of a removable component.

13. The method of claim 6, wherein the depositing the nanofiber layer comprises electrospinning.

14. The method of claim 6, wherein the nanofiber layer comprises polyvinylidene fluoride nanofibers.

15. The method of claim 6 further comprising calendering the substrate to a thickness less than 30 micrometers.

16. A porous support for a fuel cell membrane, the porous support comprising: a woven layer comprising a yarn of polyvinylidene fluoride fiber, wherein the yarn is 7 denier to 25 denier; and a nanofiber layer comprising polyvinylidene fluoride nanofibers deposited on the woven layer, wherein the nanofiber layer is 1 to 10 micrometers thick; wherein the porous support exhibits a porosity of at least 70 percent; and wherein the porous support is less than 30 micrometers thick.

17. The porous support of claim 16, wherein the yarn has a number of filaments in the range of 4 to 10.

18. The porous support of claim 16, wherein the nanofiber layer is an electrospun layer.

19. The porous support of claim 16, wherein the nanofiber layer has an average pore size of less than 1.5 micrometers.

* * * * *